June 22, 1954  G. L. OLSON  2,681,552
FLEXIBLE COUPLING
Filed March 12, 1949
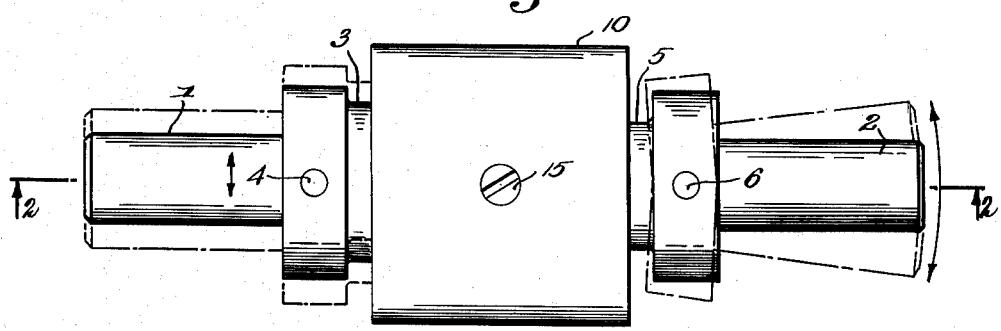
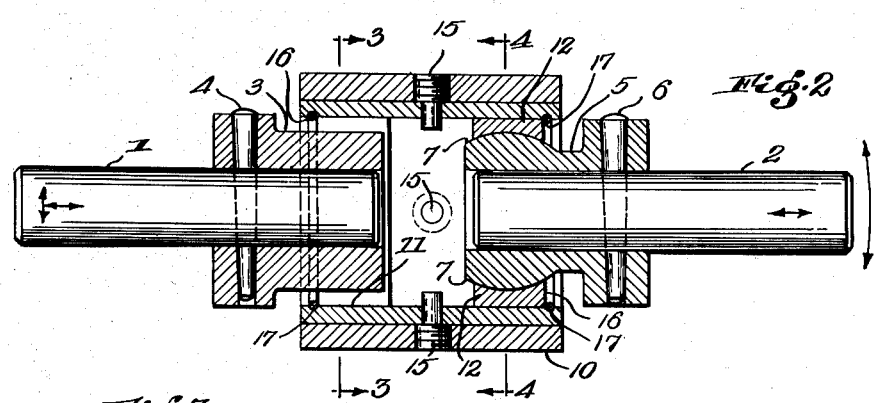
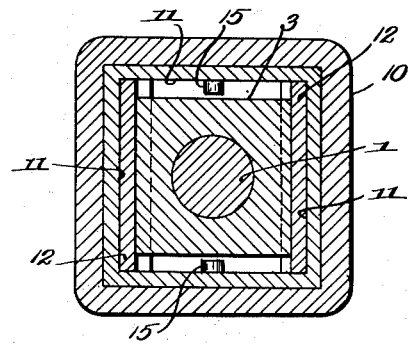 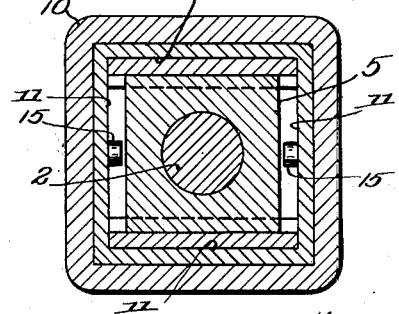
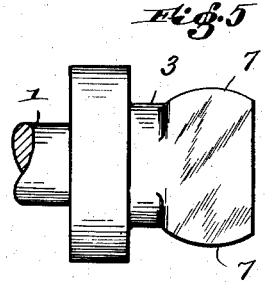 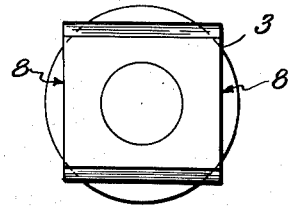 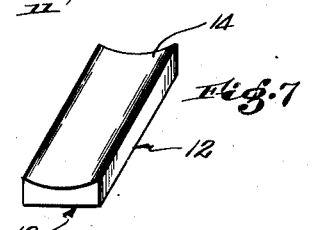
Inventor
Gorden L. Olson
by Dike, Calver & Porter
his Attys.

Patented June 22, 1954

2,681,552

UNITED STATES PATENT OFFICE 2,681,552

FLEXIBLE COUPLING

Gordon L. Olson, Arlington, Mass.

Application March 12, 1949, Serial No. 81,082

1 Claim. (Cl. 64—8)

My present invention relates to a flexible coupling for shafting. Objects of the invention are to provide a coupling which is capable of permitting angular and offset misalinement of shafts, which is capable of permitting endwise or longitudinal shifting of shafts, and which is also capable of serving as a universal joint. Other objects are to prevent backlash and chattering.

Various attempts have heretofore been made to provide such couplings. In general, they have been characterized by the presence of trunnions, or, in the absence of trunnions, of lack of smooth and positive driving connections. The device of the present invention avoids the use of trunnions, and yet has the close fit and positive drive of the trunnion-type of coupling.

The nature and objects of the invention will best be understood from the following description in conjunction with the accompanying drawings, in which:

Fig. 1 is a plan view of the coupling of the invention;

Fig. 2 is a cross section taken on line 2—2 of Fig. 1.

Fig. 3 is a section taken on the line 3—3 of Fig. 2;

Fig. 4 is a section taken on the line 4—4 of Fig. 2; and

Figs. 5, 6 and 7 are detail views.

In the drawings, a shaft 1 is a driving or driven shaft which transmits power to or receives it from a shaft 2. Shaft 1 carries a slipper head 3 which is secured thereto as by a pin 4, and shaft 2 likewise carries slipper head 5 which is secured thereto as by a pin 6. Each slipper head has a generally square forward end, as shown best in Fig. 6. Each slipper head, on opposite sides of the squared portion, has convex surfaces 7—7. The remaining sides, as indicated at 8 in Fig. 6, are flat. Each convex surface 7 is a segment of a cylinder, and is radially disposed with the center of the shaft.

The shafts 1 and 2 are joined by a hollow coupling body or shell 10 having a rectangular, preferably square, opening which extends completely through said body. This opening is somewhat larger than the square or rectangular slipper heads, and is defined by machined surfaces which constitute ways 11 for four shoes 12, all of which are constructed alike. Each shoe has a flat surface 13 adapted to follow ways 11 and a concave surface 14 (Fig. 7) which is adapted to receive and fit closely on any of the convex surfaces 7 on said heads, and has the same radial curvature as the surfaces 7. One pair of shoes 12 is placed on the curved parts of one of the slipper heads, which is then introduced into the coupling body as shown in Fig. 2. The remaining pair of shoes 12 is placed on the curved parts of the other slipper head and then introduced into the coupling body so that the latter shoes are disposed at right angles to the first two shoes. The four walls 11 constitute ways for said shoes. Each pair of shoes can be moved inwardly toward the center of the coupling body until stopped by removable projecting pins or stops 15, and can be slid outwardly toward the edge of the body 10 until contact is established with a holding device 16, which may be in the form of a split retaining ring. The ring 16 rests in grooves 17 in each of the four interior walls 11 of the body 10.

The shoes 12 fill substantially all of the space between the convex surfaces of the heads 3 and 5 and the guideways 11, ensuring a smooth close fit of the bearing parts. The heads cannot move bodily in the direction of a shoe. There is ample space between the flat walls 8 of the heads 3 and 5 and the ways 11, however, for the heads to move for a distance equal to the thickness of a shoe in a line of travel parallel to the longitudinal axes of the shoes. It follows that a variety of possible displacements is afforded without any loss of close-fitting contact in the coupling. As viewed in Fig. 2, shaft 1 can slide bodily upwardly or downwardly, or can move inwardly (to the right in Fig. 2) or outwardly to the extent permitted by the retaining ring 16, but cannot move laterally except by angular or swinging displacement of the shaft. On the other hand, shaft 2, as viewed in Fig. 2, can move longitudinally as indicated by the arrows, can slide laterally without swinging, and can swing about the end pivoted in the body 10 either upwardly or downwardly as indicated by the arrows at the end of the shaft. The inner or captive end of the shaft 2 cannot move bodily upward or downward.

The movements described permit a wide range of adaptability. The shafts can be opposed, parallel, or axially misaligned; nevertheless, the driving connections are always the same. Chattering and backlash are avoided. Pivoting, for axial misalinement, is always at the cylindrical surfaces of shoes and slipper heads. Sliding is likewise at this junction, and inward and outward displacement is effected by the relation of the shoes to the ways 11.

The simplicity of the construction makes it practically impossible for the device to be improperly assembled. There is nothing to "peen out," as where trunnions are used. The bearing surfaces are ample to take heavy loads. There is no significant play between bearing surfaces, regardless of the position of the drive. The sliding cylindrical surfaces permit a close fit at all times.

I claim:

A shaft coupling for connecting a pair of shafts, said coupling comprising a housing, a slipper head attachable to each shaft, a pair of shoes for each head, said housing having an axially disposed slideway receiving each pair of shoes, each pair of shoes being disposed at right angles to the other pair thereof, each of said heads including a pair of oppositely disposed convex bearings of substantial length and extending at right angles to the shaft axis and each shoe having a concave bearing receiving channel of greater length than said bearings, said heads and said shoes being dimensioned relative to each other to enable said heads to slide relative to said shoes.

References Cited in the file of this patent

UNITED STATES PATENTS

| Number | Name | Date |
|---|---|---|
| 1,103,716 | Wallbillich | July 14, 1914 |
| 1,109,006 | Neal | Sept. 1, 1914 |
| 1,128,430 | Fetzer | Feb. 16, 1915 |
| 1,231,249 | Gardner | June 26, 1917 |
| 1,346,253 | Rayfield | July 13, 1920 |
| 1,411,468 | Wood | Apr. 4, 1922 |
| 1,577,575 | Geiger | Mar. 23, 1926 |
| 1,861,365 | Schreck | May 31, 1932 |
| 2,441,052 | Wilmer | May 4, 1948 |